(12) United States Patent
Gruendl et al.

(10) Patent No.: US 8,274,194 B2
(45) Date of Patent: Sep. 25, 2012

(54) AUXILIARY ASSEMBLY OF AN INTERNAL COMBUSTION ENGINE

(75) Inventors: Andreas Gruendl, Starnberg (DE);
Bernhard Hoffmann, Starnberg (DE);
Stephan Steyer, Gelnhausen (DE);
Anton Wolf, Gelnhausen (DE); Uwe Reichert, Schlüchtern (DE)

(73) Assignee: Compact Dynamics GmbH, Starnberg (DE)

( * ) Notice: Subject to any disclaimer, the term of this patent is extended or adjusted under 35 U.S.C. 154(b) by 308 days.

(21) Appl. No.: 12/667,839

(22) PCT Filed: Jun. 26, 2008

(86) PCT No.: PCT/EP2008/005236
§ 371 (c)(1),
(2), (4) Date: May 7, 2010

(87) PCT Pub. No.: WO2009/003638
PCT Pub. Date: Jan. 8, 2009

(65) Prior Publication Data
US 2010/0219711 A1 Sep. 2, 2010

(30) Foreign Application Priority Data
Jul. 5, 2007 (DE) .......................... 10 2007 031 239

(51) Int. Cl.
*H02K 1/12* (2006.01)
(52) U.S. Cl. ....................................................... 310/257
(58) Field of Classification Search .................. 310/257, 310/49.11, 49.15, 49.29, 156.25
See application file for complete search history.

(56) References Cited

U.S. PATENT DOCUMENTS

| 3,508,091 A | 4/1970 | Kavanaugh |
| 4,695,419 A | 9/1987 | Inariba |
| 4,990,806 A * | 2/1991 | Kikuchi et al. ............ 310/49.11 |
| 6,864,616 B2 * | 3/2005 | Hollenbeck et al. .......... 310/257 |
| 7,449,805 B2 * | 11/2008 | Bin .............................. 310/49.14 |
| 7,898,123 B2 * | 3/2011 | Usui .......................... 310/49.01 |
| 2007/0145834 A1 | 6/2007 | Usui |
| 2010/0289348 A1 * | 11/2010 | Gruendl et al. ................ 310/54 |

FOREIGN PATENT DOCUMENTS

| DE | 44 23 952 A1 | 1/1995 |
| DE | 43 45 316 A1 | 7/1996 |
| DE | 699 27 564 | 7/2006 |
| DE | 10 2005 036 041 | 2/2007 |
| EP | 0 706 461 | 12/1996 |
| EP | 1 134 383 A | 9/2001 |

* cited by examiner

*Primary Examiner* — Dang Le (57) ABSTRACT

In the drive train of a combustion engine an auxiliary arrangement is arranged which is to be coupled with an axial flow machine including a stator and a rotor, in order to perform an actuating movement. The stator has a coil arrangement, and the rotor has an essentially cup-shaped support for permanent magnet elements. The coil arrangement of the stator has at least one cylindrical winding and is at least partially enclosed by two essentially pot-shaped magnetic flux yokes. Each of the pot-shaped magnetic flux yokes has side areas with magnetic flux poles whose outsides are oriented towards the permanent magnet elements of the rotor. The magnetic flux poles of the stator are arranged spaced apart from the permanent magnet elements of the rotor. The magnetic orientation of neighboring permanent magnet elements towards the air gap alternates.

9 Claims, 6 Drawing Sheets

AUXILIARY ASSEMBLY OF AN INTERNAL COMBUSTION ENGINE

SCOPE

Herein, an auxiliary assembly of a combustion engine is presented. The auxiliary assembly may, for example, be a turbocharger with variable turbine geometry, which has variable guide vanes. However, other auxiliary assemblies for moving, guiding, controlling, regulating, metering, and dosing of one or several substance flows, such as air, fuel-air mixture, exhaust gas, etc. in the environment of a combustion engine, which have regulated or controlled, actively adjustable components, such as fluid flaps (air flaps, exhaust gas flaps, air-flow control flaps or the like), are meant to be understood by such an auxiliary assembly.

BACKGROUND

Not least, it is the ever increasing requirements for $NO_x$ and $CO_x$ emissions that necessitate a very precise and highly dynamic engine management of combustion engines and their associated or downstream connected assemblies in the drive train which, moreover, may be realised by means of assemblies which can be manufactured economically and which are reliable. As an example for this, an exhaust gas recirculation scheme should be mentioned which has a very distinct influence on the $NO_x$ emission. Herein, a proportion of the exhaust gas flow is mixed with the aspirated fresh air as a function of the engine characteristics and the engine temperature and recirculated to the engine cylinders. Thereby, the oxygen content is reduced during combustion, which leads to a lower combustion temperature and results in a reduced $NO_x$ emission. Initially, only on-off valves were used for adding the exhaust gas flow to the aspirated fresh air. In the meantime, pneumatically controlled actuators are employed as well.

In order to increase the efficiency of the combustion engine, a combination of a combustion engine and an exhaust gas turbocharger may be employed. Due to the increased working pressure, the utilisation of the exhaust gas energy increases. In addition, the ratio of mechanical power loss to the overall power becomes better so that the efficiency increases. Because of the large speed range (idle up to several thousands of revolutions per minute), in particular, the full load charging pressure increases to a particularly high degree, which leads to an undesired load of the power plant. In order to limit the charging pressure, a so-called waste gate (bypass valve) may be used. An approximation of the air provided by the turbocharger to the air requirement of the combustion engine, which is dependent on the operating point, may also be achieved by a variable turbine geometry. This includes a turbine with nozzle wings at the turbine casing circumference in an annular design, which has numerous annular wings which are capable of being rotated in the casing outside the turbine wheel circumference. Another variant is a turbine with nozzle wings at the turbine casing circumference with a mechanical coupling. Here, the turbine has e. g. eight mechanically coupled wings so that they may be adjusted together and their spacing as well as the inlet cross-sectional area varied. The outlet cross-section of other variants of the turbocharger is infinitely variable by a simultaneous actuation of the wings.

For the majority of such auxiliary assemblies, stringent requirements with respect to the temperature stability of the actuator drives apply, which are located in the immediate, very hot environment of the combustion engine. An actuator drive of such an auxiliary assembly must demonstrate, for example, up to 150 to 160° C. and above as a safe operating temperature. Moreover, the stability requirements for an actuator drive of such auxiliary assemblies in an environment characterised by heavy vibrations and shocks are particularly high.

From document DE 10 2005 036 041 A1, a permanent-excited electrical machine with a stator and a rotor is known, wherein either the stator comprises a coil arrangement and the rotor is provided with permanent magnet elements, or the rotor comprises a coil arrangement and the stator is provided with permanent magnet elements. An air gap is formed between the stator and the rotor, which is defined by the permanent magnet elements and by magnetically conductive stator teeth which are aligned with these in certain positions. The coil arrangement has at least one hollow cylindrical winding.

Said stator or its parts may be built from metal sheets or sheet metal portions or formed from iron particles which are pressed and/or sintered into a corresponding shape. It is also possible to use mixed shapes from these two variants, wherein the transition areas from the radially oriented sheet metal portions to axially oriented sheet metal portions are formed from pressed or sintered iron particles.

From document DE 699 27 564 T2, a claw-pole dynamo for a bicycle is known, wherein the stator yoke is formed from pure iron magnetic steel sheets.

Document EP 0 706 461 B1 relates to an electrical drive unit for a vehicle, which is particularly suited for the travel drive of road vehicles, which consists of two electrical machines the housings of which are flanged together with the end faces in axial alignment. These electrical machines have an external rotor with a wheel body, and an internal annular stator which is formed from stator windings and stator core assemblies with an axial cylindrical recess, and which securely connected with the housing. A rotor shaft which is firmly connected with the wheel body protrudes into the axial recess of the stator. A coupling means for the output is connected with a bearing which is rotatable relative to the housing. The respective wheel body is arranged at the end face at which the two electrical machines are flanged together. The coupling means is essentially arranged within the axial recess of the stator.

UNDERLYING PROBLEM

It is therefore the object to create an auxiliary assembly in the drive train of a combustion engine, whose actuator drive is capable of performing precise and high dynamic (angle) actuating movements, and which lends itself to economic series production. The angle actuating movements may cover a few tens of angular degrees up to several thousands of angular degrees, with the possible requirement to perform said angle actuating movements with an actuating accuracy of, e. g., a few tenths angular degrees. In addition to or in place of the actuating accuracy, there may also be the requirement to perform the angular actuating movements at a high angular velocity of, for example, a few microseconds per degree. Finally, there may be the requirement for the auxiliary assembly to be able to perform actuating movements which, for example, require a torque of several Newton metres (Nm).

SOLUTION

For this purpose, an auxiliary assembly of a combustion engine is proposed which possesses the characteristics of claim 1. For carrying out an actuating movement, this auxiliary assembly of a combustion engine is to be coupled with an axial flow machine which comprises a stator and a rotor. The auxiliary assembly has a housing which is formed as a deep drawn part or as a casting. The stator has a coil arrangement, and the rotor has a cup-shaped support for the permanent magnet elements. The coil arrangement of the stator has at least one cylindrical winding and is at least partially enclosed by two essentially pot-shaped magnetic flux yokes. Each of the magnetic flux yokes comprises side areas with magnetic flux poles whose outsides are oriented towards the permanent magnet elements of the rotor. The magnetic flux poles of the stator are arranged at a distance from the permanent magnet elements of the rotor so as to form an air gap, whose magnetic orientation towards the air gap alternates. In certain positions of the rotor relative to the stator, the permanent magnet elements of the rotor are oriented so as to be at least partially aligned with at least some of the magnetic flux poles of the rotor. The cup-shaped support of the rotor is formed as a deep-drawn part from pure iron. The pot-shaped magnetic flux yokes are formed from pure iron as punched and bent parts or castings. Each magnetic flux yoke has an essentially flat bottom area with a central opening for arranging each magnetic flux yoke secured against rotation on a stator support which comprises a cylindrical tube formed from pure iron.

If the stator is equipped with the coil arrangement and the rotor with the permanent magnet elements this prevents the necessity of dynamic (e. g. rotating) current transitions to a coil arrangement located within the rotor.

The air gap between the magnetic flux poles of the stator and the permanent magnet elements of the rotor may range from approx. 0.1 mm to approx. 0.5 mm, with all intermediate values being considered as disclosed herein.

EMBODIMENTS AND DEVELOPMENTS

The cup-shaped rotor support and/or the pot-shaped magnetic flux yokes are formed from pure iron. The term pure iron relates to an iron metal with a homogenous crystal structure, a low oxygen content, and a high cleanness of slag. The sum of the contaminants in pure iron may normally be below approx. 0.10%. Carbon may be below approx. 0.01%, silicon may be present in traces only, manganese may be below approx. 0.06%, phosphorus below approx. 0.01%, and sulphur may be below approx. 0.01%. Due to the low carbon content, the microstructure of such pure iron consists of pure ferrite. Pure iron of this kind is highly resistant to electrolytic self-destruction which occurs at the interfaces between the iron crystals and the dispersed accompanying elements. Further, it has a higher resistance to corrosion, oxidation as well as other chemical influences. It has a very good deformability at low temperatures and excellent electrical and magnetic properties. Under thermal stress, pure iron is attacked more slowly by many substances which decompose iron than is the case with carbon steels. Pure iron has also a high magnetic saturation, a low coercive field strength and remanence, as well as a high permeability, in particular, in medium induction ranges.

The side areas of the magnetic flux yokes may have spaced webs which form the magnetic flux poles. Webs of a magnetic flux yoke may be spaced apart in such a manner that they and correspondingly shaped webs of an opposite located magnetic flux yoke engage in a finger-like manner. Webs of a magnetic flux yoke may be essentially parallelepiped-shaped. It is also possible to form them in a shape which tapers widthwise and/or lengthwise towards the ends. Such shapes reduce or minimise the magnetic stray fluxes between neighbouring webs of the magnetic flux yokes. This is primarily dependent on the operating frequency of the current which flows through the coil arrangement, because the eddy current losses in magnetic flux conducting pieces made from solid ferriferous metal increase with an increasing frequency.

Each magnetic flux yoke has an essentially flat bottom area with a central opening for arranging each magnetic flux yoke secured against rotation on a stator support. For this purpose, the opening has a non-circular cross-section, and the stator support is designed as an approximately complementarily shaped cylinder. The stator support is a cylindrical tube which is also formed from pure iron. Each magnetic flux yoke may have an interruption which starts from the central opening in the bottom area and which ends between two webs in the side area. It is also possible to form a longitudinal slot in the cylindrical tube. Mixed configurations of the designs with slot and without slot are possible as well. The slot may not extend over the full width; one or more transverse webs may be provided for maintaining/increasing the stability of the arrangement. This depends on both the material used and the stresses to which the magnetic flux yokes are subjected. The occurrence of eddy currents or of a significant magnetic flux in the circumferential direction of the stator is thereby precluded more or less completely. Each magnetic flux yoke may be manufactured from a single piece or several pieces, e. g. from two pieces of pure iron sheet metal with a material thickness ranging from between approx. 1.5 mm to approx. 5 mm, with all intermediate values being considered as disclosed herein.

The permanent magnet elements of the rotor may be formed as castings or cut pieces from an AlNi or an AlNiCo alloy, from barium or strontium ferrite, or from an SmCo or NdFeB alloy. This makes it possible to achieve energy products $(BH)_{max}$ of permanent magnets from approx. 30 to approx. 300 kJ/m$^3$—even at higher temperature ranges from approx. 150 to approx. 180° C.

In order to increase the mechanical stability, the permanent magnets may also be formed as powder particles embedded in temperature resistant synthetic material binding agents which include e. g. polyamide, polyphenesulphide, thermosetting plastic, epoxy resin or the like. The temperature resistant synthetic materials may also be methacrylate adhesive, epoxy resin adhesive, polyurethane adhesive, phenolic resin adhesive, epoxy resin with fibre reinforcement or water repellent epoxy casting resin.

The permanent magnet elements may be essentially parallelepiped-shaped. They may have a shape which is essentially corresponding to the shape of webs of the magnetic flux yokes; in a plan view towards the air gap, they may therefore be rectangular, trapezoidal or triangular or rhombic, respectively, or the like. In order to achieve an essentially constant air gap in terms of the gap dimension, the contour of the rotor may be complementarily formed into the permanent magnet elements.

The axial flow machine has a housing which is formed as a deep-drawn part or a casting, e. g. from steel sheet metal or synthetic material, or from aluminium.

An output shaft may protrude from the housing of the axial flow machine, which is connected with the cup-shaped rotor support so as to be secured against rotation, and of which at least portions may be rotatably supported in the cylindrical tube of the stator support.

An electronic control unit may be accommodated in the housing of the axial flow machine, which has to be connected with a current supply unit and be fed with a set position or angle signal, and which has to be connected with a rotation position or rotation angle transducer which detects the rotational movements of the output shaft in order to correspondingly control the coil arrangement of the stator.

The axial flow machine may have to be coupled with a device to be actuated in the auxiliary arrangement without a step-up or reduction gear. This may be, for example, a planet gear, a helical gear, a bevel gear, a worm gear or another rotating gear for changing the speed and/or the torque. This does not include a toggle mechanism or an eccentric drive, a cam disc or the like for converting the rotational movement into a longitudinal/pivoting actuating movement.

SHORT DESCRIPTION OF THE FIGURES

Further characteristics, properties, advantages and possible modifications will become apparent for those with skill in the art from the following description in which reference is made to the accompanying drawing.

DETAILED DESCRIPTION OF THE FIGURES

Figure 1:
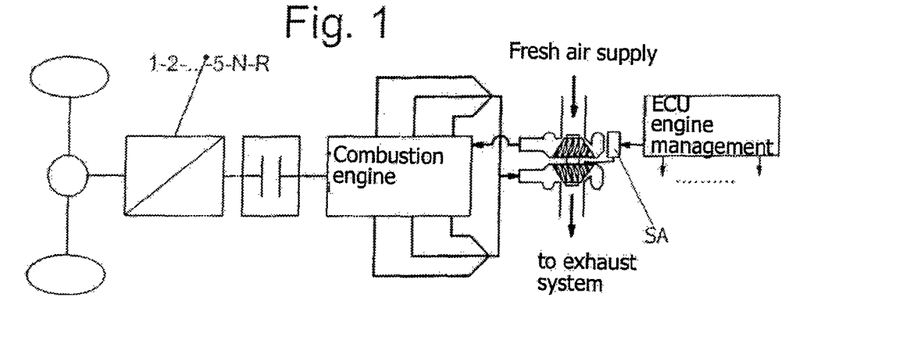
FIG. 1 is a schematic illustration of a drive train of a motor vehicle, with the combustion engine being associated as an example with an auxiliary arrangement in the form of a turbocharger with variable geometry.

FIG. 1 shows a drive train of a motor vehicle with combustion engine, clutch, gear change gearbox, differential, and two driven wheels, with the combustion engine being associated with a turbocharger with variable turbine inlet geometry as an auxiliary arrangement. The entire exhaust gas flow of the combustion engine is processed in accordance with the operating point by means of an arrangement (not shown in detail) comprising a plurality of (e. g. eight to ten) pivotable guide vanes located at the radial turbine inlet of the turbocharger in order to pressurise fresh air from the air inlet and supply it to the combustion engine. By means of this control of the exhaust gas flow, a rapid run-up of the rotating parts and thus a rapid build-up of the charging pressure combined with a higher rated output at a reduced fuel consumption of the motor vehicle may be achieved.

An engine management ECU provides the actuator drive SA of the auxiliary arrangement in the drive train of a combustion engine with corresponding control signals. The actuator drive SA is coupled without gearbox via a crank drive (only schematically indicated) with the pivotable guide vanes at the radial turbine inlet of the turbocharger.

Figure 2:
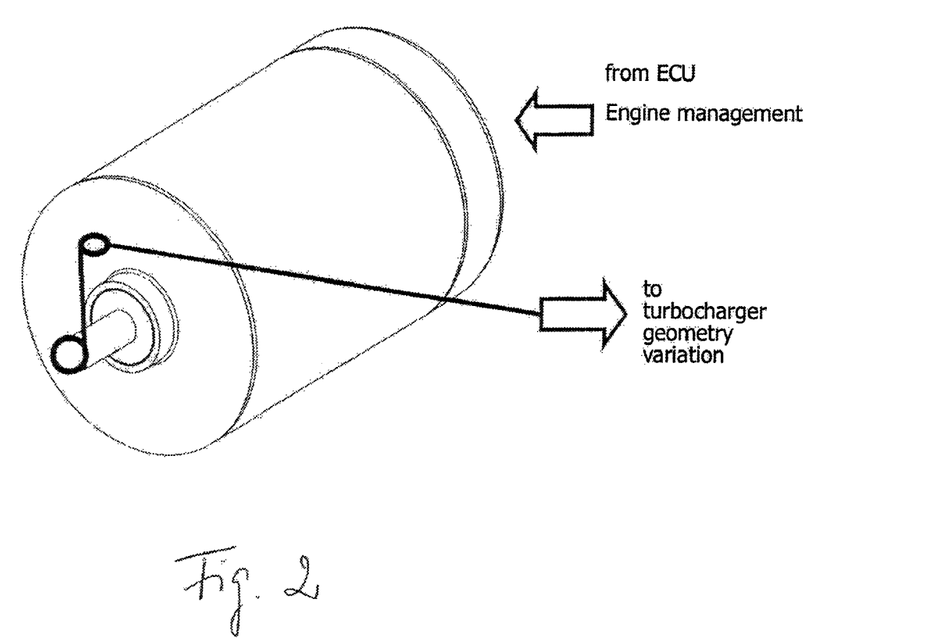
FIG. 2 shows a schematic illustration of an actuator drive of the auxiliary arrangement in FIG. 1, with the actuator drive being an axial flow machine.

As is illustrated in FIG. 2, the actuator drive SA is designed as an axial flow machine. An electronic control unit (not shown in detail) is accommodated in the housing of the axial flow machine, which has to be connected with a current supply and to be fed with a set position signal, and which has to be connected with a rotation angle or rotation position transducer in order to effect an adjustment of the pivotable guide vanes. In lieu of an electronic control unit arranged in the housing of the axial flow machine for the processing of set position signals, the signal processing may also be performed in its entirety in the engine management ECU, with an actual position signal which is generated by the rotation angle or rotation position transducer to be supplied to the ECU in this case so that it may directly perform the control of the axial flow machine.

Figure 3:
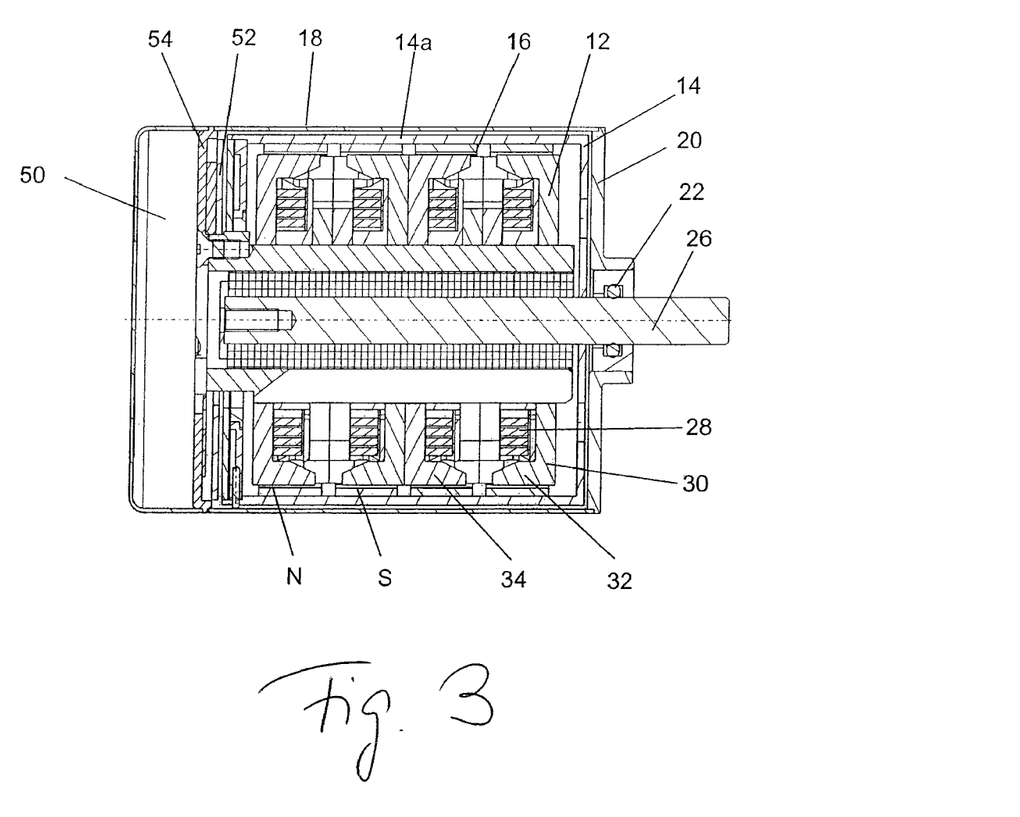
FIG. 3 shows a schematic longitudinal section of the axial flow machine in FIG. 2.

FIG. 3 shows a longitudinal section through an embodiment of an axial flow machine 10 in the configuration as an external rotor machine. The axial flow machine 10 has a stator 12 and a rotor 14. The rotor 14 has a cup-shaped pure iron support 14a for permanent magnet elements N, S. The stator 12 has several (here four) coil arrangements 28. Each coil arrangement 28 of the stator 12 has a circular cylindrical winding and is enclosed on its outside by two essentially pot-shaped magnetic flux yokes 30. Each of the pot-shaped magnetic flux yokes 30 has side areas 32 with magnetic flux poles 34. The outsides of the magnetic flux poles 34 are oriented towards the permanent magnet elements N, S of the rotor 14.

An annular cylindrical air gap 16 is formed between the rotor 14 and the stator 12. The magnetic orientation of neighbouring permanent magnet elements N, S of the rotor 14 towards the air gap 16 alternates. In certain positions of the rotor 14 relative to the stator 12, the permanent magnet elements N, S are oriented in alignment with the magnetic flux poles 34 of the rotor 14. The permanent magnet elements are formed from an SmCo or NdFeB alloy. The pot-shaped magnetic flux yokes 30 are formed from pure iron as punched and bent parts. The stator 12 and the rotor 14 are accommodated in a single-piece deep-drawn tubular housing 18 made from steel sheet, which is hermetically sealed by a bearing shield 20 with a floating ring seal bearing 22 for an output shaft 26. The output shaft 26 is firmly connected, e. g. welded, against rotation with the rotor 14.

The housing 18 further accommodates an electronic control unit 50 which is to be connected with a current supply and to be fed with a set position signal. This electronic control unit 50 also receives sensor signals from a rotation angle or rotation position transducer 52 which detects the rotational movements of the output shaft 26 in order to correspondingly control the coil arrangement 28 of the stator 12. The electronic control unit 50 is separated by a partition wall 54 which also holds the angle or rotation position transducer 52 which is configured as a resolver. Other sensors, e. g. incremental transducers or others may be employed in place of the resolver.

Figure 4:
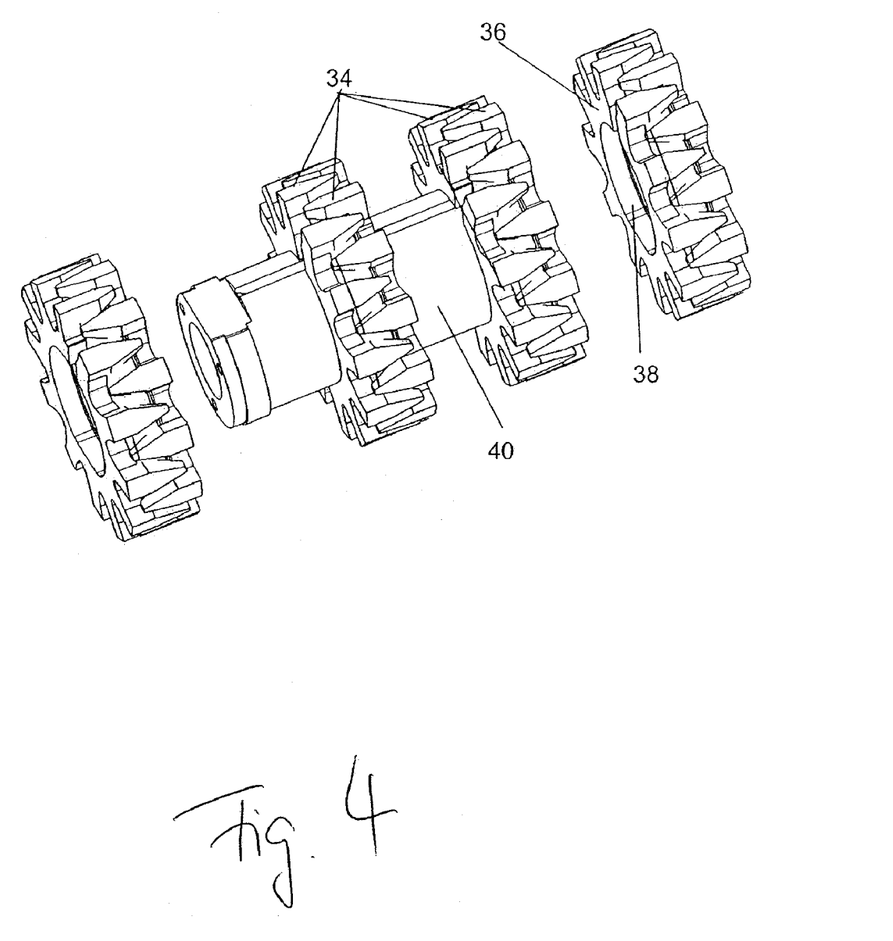
FIG. 4 shows a schematic perspective illustration of a stator of the axial flow machine in FIG. 3.
Figure 5:
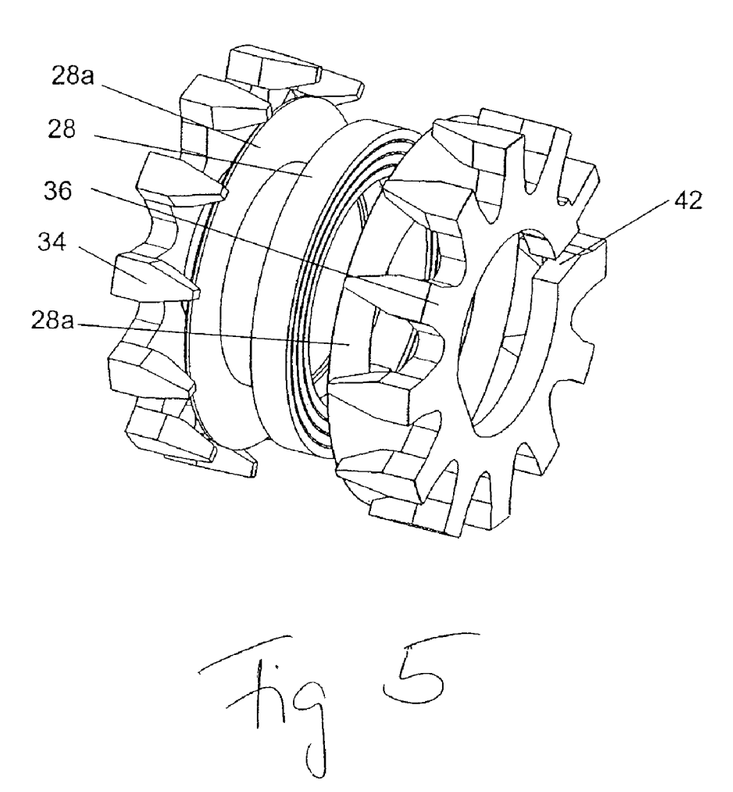
FIG. 5 shows a schematic enlarged perspective illustration of a stator core of a stator in FIG. 4.

As can be seen more clearly from FIGS. 4, 5, the side areas 32 of the magnetic flux yokes 30 have a plurality of spaced webs on their circumference, which form the magnetic flux poles 34. Webs 34 of a magnetic flux yoke 30 are spaced apart in such a manner that they and correspondingly shaped webs 34 of an opposite located magnetic flux yoke 30 engage in a finger or claw-like manner and surround and enclose the coil arrangement 28 of the stator 12 on its outside. Each magnetic flux yoke 30 has an essentially flat bottom area 36 with a central opening 38. The central opening 38 is asymmetrically shaped in order to fix each magnetic flux yoke 30 secured against rotation on a cylindrical tube made of pure iron, which serves as a stator support 40.

Each magnetic flux yoke 30 has an interruption 42 which starts from the central opening 38 in the bottom area 36 and which ends between two webs 34 in the side area 32. Each magnetic flux yoke 30 is made as a single piece which is manufactured by punching and bending from a pure iron metal sheet with a material thickness ranging from approx. 1.5 to 5 mm.

Figure 6:
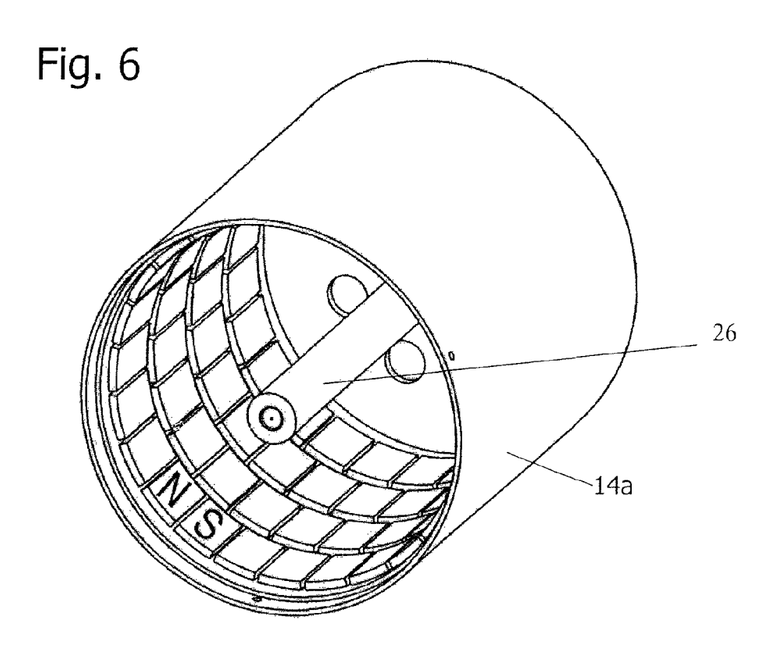
FIG. 6 shows a schematic perspective illustration of a rotor of the axial flow machine in FIG. 2.

FIG. 6 shows the rotor 14 of the axial flow machine. The rotor 14 has the cup-shaped deep-drawn support 14a which is open at an end face, at whose circular cylindrical inner wall the permanent magnet elements N, S in coaxial rows in a staggered arrangement in the circumferential direction are positively fastened by adhesive bonding, casting or in another manner. The output shaft 26 extends through the interior of the cup-shaped support 14a and is rotatably supported in the longitudinally slotted stator support 40.

The ratios of the individual parts and portions thereof shown in the figures and their dimensions and proportions are not to be construed as being limiting. Rather may individual dimensions and proportions deviate from the illustrated ones.

The invention claimed is:

1. An auxiliary arrangement of a combustion engine, which is to be coupled with an electrical axial flow machine for performing an actuating movement, comprising a stator and a rotor, wherein
    the auxiliary arrangement comprises a housing which is formed as a deep-drawn part or casting,
    the stator comprises a coil arrangement, and
    the rotor comprises a cup-shaped support for permanent magnet elements (N, S),
    the coil arrangement of the stator comprises at least one cylindrical winding and is at least partially enclosed by two essentially pot-shaped magnetic flux yokes, wherein
    each of the pot-shaped magnetic flux yokes comprises side areas with magnetic flux poles whose outsides are oriented towards the permanent magnet elements (N, S) of the rotor,
    the magnetic flux poles of the stator are arranged at a distance from the permanent magnet elements (N, S) of the rotor so as to form an air gap, whose magnetic orientation towards the air gap alternates, and in certain positions of the rotor relative to the stator are oriented so as to be at least partially aligned with at least some of the magnetic flux poles of the rotor,
    the cup-shaped support of the rotor is formed as a deep-drawn part from pure iron, and
        the pot-shaped magnetic flux yokes are formed from pure iron as punched and bent parts or castings, wherein
    each magnetic flux yoke has an essentially flat bottom area with a central opening in order to arrange each magnetic flux yoke secured against rotation on a stator support which comprises a cylindrical tube formed from pure iron, and
        each magnetic flux yoke comprises an interruption which starts from the central opening in the bottom area and which ends between two webs in the side area.

2. The auxiliary arrangement according to claim 1, wherein the side areas of the magnetic flux yokes have spaced webs which form the magnetic flux poles.

3. The auxiliary arrangement according to claim 2, wherein the webs of a magnetic flux yoke are spaced apart in such a manner that they and correspondingly shaped webs of an opposite located magnetic flux yoke engage in a finger-like manner.

4. The auxiliary arrangement according to claim 1, wherein each magnetic flux yoke is manufactured from a single piece of pure iron sheet metal with a material thickness ranging from between approx. 1.5 mm to approx. 5 mm.

5. The auxiliary arrangement according to claim 1, wherein the permanent magnet elements (N, S) of the rotor are formed from an AlNi or an AlNiCo alloy, from barium or strontium ferrite, or from an SmCo or NdFeB alloy, also embedded in synthetic material binding agents which include polyamide, polyphenesulphide, thermosetting plastic, epoxy resin or the like.

6. The auxiliary arrangement according to claim 1, wherein the permanent magnet elements (N, S) are essentially parallelepiped-shaped.

7. The auxiliary arrangement according to claim 1, wherein the axial flow machine comprises an output shaft which protrudes from the housing, which is connected with the cup-shaped support of the rotor so as to be secured against rotation, and of which at least portions are rotatably supported in the cylindrical tube of the stator support.

8. The auxiliary arrangement according to claim 1, wherein an electronic control unit is accommodated in the housing of the axial flow machine, which has to be connected with a current supply unit and be fed with a set position signal, and which has to be connected with a rotation angle or rotation position transducer in order to correspondingly control the coil arrangement of the stator.

9. The auxiliary arrangement according to claim 1, wherein the axial flow machine is to be coupled with a device to be actuated in the auxiliary arrangement without a step-up or reduction gear.

\* \* \* \* \*